June 7, 1932.  S. G. RUSSELL  1,861,819
FISHING REEL
Filed March 6, 1930
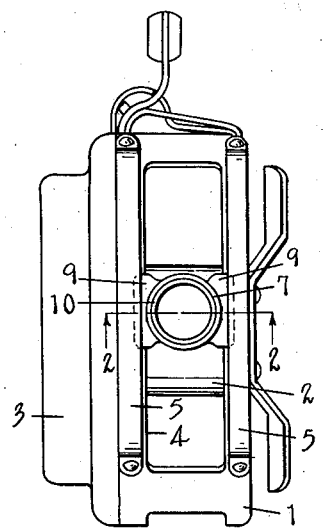
Fig. 1
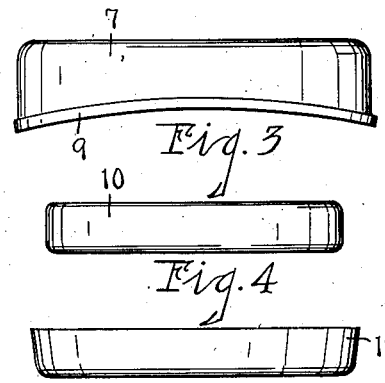
Fig. 3
Fig. 4
Fig. 5
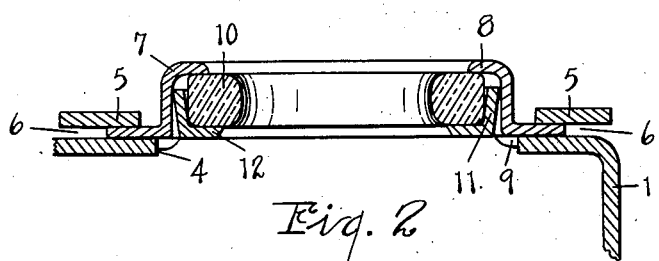
Fig. 2
INVENTOR
Samuel G. Russell
BY Chappell & Earl
ATTORNEYS Patented June 7, 1932

1,861,819

UNITED STATES PATENT OFFICE

SAMUEL G. RUSSELL, OF KALAMAZOO, MICHIGAN, ASSIGNOR TO SHAKESPEARE COMPANY, OF KALAMAZOO, MICHIGAN

FISHING REEL

Application filed March 6, 1930. Serial No. 433,542.

The main object of this invention is to provide in a fishing reel an improved line guide eye mounting by means of which line guide eyes of agate or other non-metallic material are supported so that the strain thereon is minimized.

A further object is to provide a structure having these advantages in which the parts may be very economically produced and are economically assembled and are adaptable to line guide eyes of considerable variation in dimensions.

Objects relating to details and economies of my invention will appear from the description to follow. The invention is defined and pointed out in the claims.

A structure which is a preferred embodiment of my invention is illustrated in the accompanying drawing, in which:

Fig. 1 is a side view of my improved fishing reel.

Fig. 2 is a fragmentary transverse section on line 2—2 of Fig. 1.

Fig. 3 is an elevation of the line guide eye housing.

Fig. 4 is an edge view of the line guide eye.

Fig. 5 is a side view of the line guide eye holder.

Referring to the drawing, the casing or frame 1 is preferably formed up of sheet metal. The spool 2 is housed within this frame and driven from a spring mechanism arranged within the casing 3, the details however of this mechanism not being illustrated. A suitable mechanism will be found in Letters Patent No. 1,510,904 issued to me October 7, 1924.

The casing has an elongated peripheral opening 4 therein at the edges of which I mount segmental slideway members 5 coacting with the casing providing ways 6 for the line guide housing 7. This line guide housing 7 is of general annular form provided with an inturned flange 8 at its outer end and segmental slides 9 coacting with the ways 6 so that the housing is supported for oscillating or sliding movement on the frame.

The line guide eye 10 is commonly formed of agate and is supported by the annular holder 11 having an inturned eye supporting flange 12 at its inner end, the eye being supported between this flange 12 and the flange 8 on the housing.

The holder 11 is preferably tapered as shown and is sleeved or telescoped into the housing engaging the walls thereof under yielding or spring tension, thereby retaining the holder by its frictional engagement with the housing. The eye is thus supported so that there is a minimum of strain on the eye and eyes having considerable variation in size may be effectively supported.

Agate constitutes a very desirable material for line guide eyes and by my improvements I provide a very effective mounting therefor.

Having thus described my invention, what I claim as new and desire to secure by Letters Patent, is:

1. In a fishing reel, the combination of a cylindrical casing having a peripheral elongated opening, a spool within said casing, slideways at the sides of said opening in said casing, an annular line guide eye housing having an inturned flange at its outer edge and laterally projecting segmental slides coacting with said slideways, an annular line guide eye, and a tapered annular holder having an inturned eye supporting flange at its inner edge sleeved within said housing in yielding frictional engagement with the walls thereof, said flange on said housing overlapping the edge of said line guide eye.

2. In a fishing reel, the combination of a cylindrical casing having a peripheral elongated opening, a spool within said casing, slideways at the sides of said opening in said casing, an annular line guide eye housing having an inturned flange at its outer edge and laterally projecting segmental slides coacting with said slideways, an annular line guide eye, and an annular holder having an inturned eye supporting flange at its inner edge frictionally sleeved within said housing, said flange on said housing overlapping the edge of said line guide eye.

3. In a fishing reel, the combination of a frame having an elongated opening with slideways at the longitudinal edges thereof, a spool, a line guide eye housing slidably mounted in said slideways, a line guide eye arranged within said housing, said housing having a flange at its outer edge overlapping said eye, and an annular holder for said eye frictionally telescoped within said housing.

4. In a fishing reel, the combination of a frame, a spool, said frame being provided with slideways disposed transversely relative to the axis of the spool, an annular line guide eye housing slidably mounted in said slideways, a line guide eye, and a line guide eye holder telescoped within and frictionally engaging the walls of said housing.

5. In a fishing reel, the combination of a frame, a spool, said frame being provided with slideways disposed transversely relative to the axis of the spool, an annular line guide eye housing slidably mounted in said slideways, a line guide eye, and a line guide eye holder frictionally telescoped within said housing.

In witness whereof I have hereunto set my hand.

SAMUEL G. RUSSELL.